J. F. POOL.
APPARATUS FOR MAKING SUCRATE OF LIME.
APPLICATION FILED MAR. 31, 1906.

912,887.

Patented Feb. 16, 1909.
3 SHEETS—SHEET 1.

J. F. POOL.
APPARATUS FOR MAKING SUCRATE OF LIME.
APPLICATION FILED MAR. 31, 1906.

912,887.

Patented Feb. 16, 1909.

UNITED STATES PATENT OFFICE.

JOHN F. POOL, OF PHILADELPHIA, PENNSYLVANIA, ASSIGNOR TO THE AMERICAN SUGAR REFINING COMPANY, OF JERSEY CITY, NEW JERSEY, A CORPORATION OF NEW JERSEY.

APPARATUS FOR MAKING SUCRATE OF LIME.

No. 912,887.      Specification of Letters Patent.      Patented Feb. 16, 1909.

Application filed March 31, 1906. Serial No. 309,116.

*To all whom it may concern:*

Be it known that I, JOHN F. POOL, a citizen of the United States, residing in Philadelphia, Pennsylvania, have invented certain Improvements in Apparatus for Making Sucrate of Lime, of which the following is a specification.

In making sucrate of lime, it is customary to mix with the molasses, or other liquid containing sugar, very finely powdered lime, and, during the operation, to circulate the liquid through a cooling apparatus. The powdered lime should be weighed, so that the necessary quantity may be added for the proper treatment of a given volume of liquid contained in the cooler and the weighted lime when conveyed to the cooler and fed into the same through a suitable device in order to insure its proper distribution to the liquid in the cooler. The powdered lime has a very irritating effect upon the eyes and upon the membranes of the nose and throat, hence the handling of the same is obnoxious to the workmen.

My invention has, therefore, been devised with the purpose of effecting, in a practically dust proof case, and without handling by the workmen, the weighing and conveying of the powdered lime and the feeding of the same to the cooling apparatus, the result being that the air of the room or apartment in which the operations are performed is kept substantially free from powdered lime, and the workmen are relieved from the inconvenience and danger due to its presence.

Figure 1:
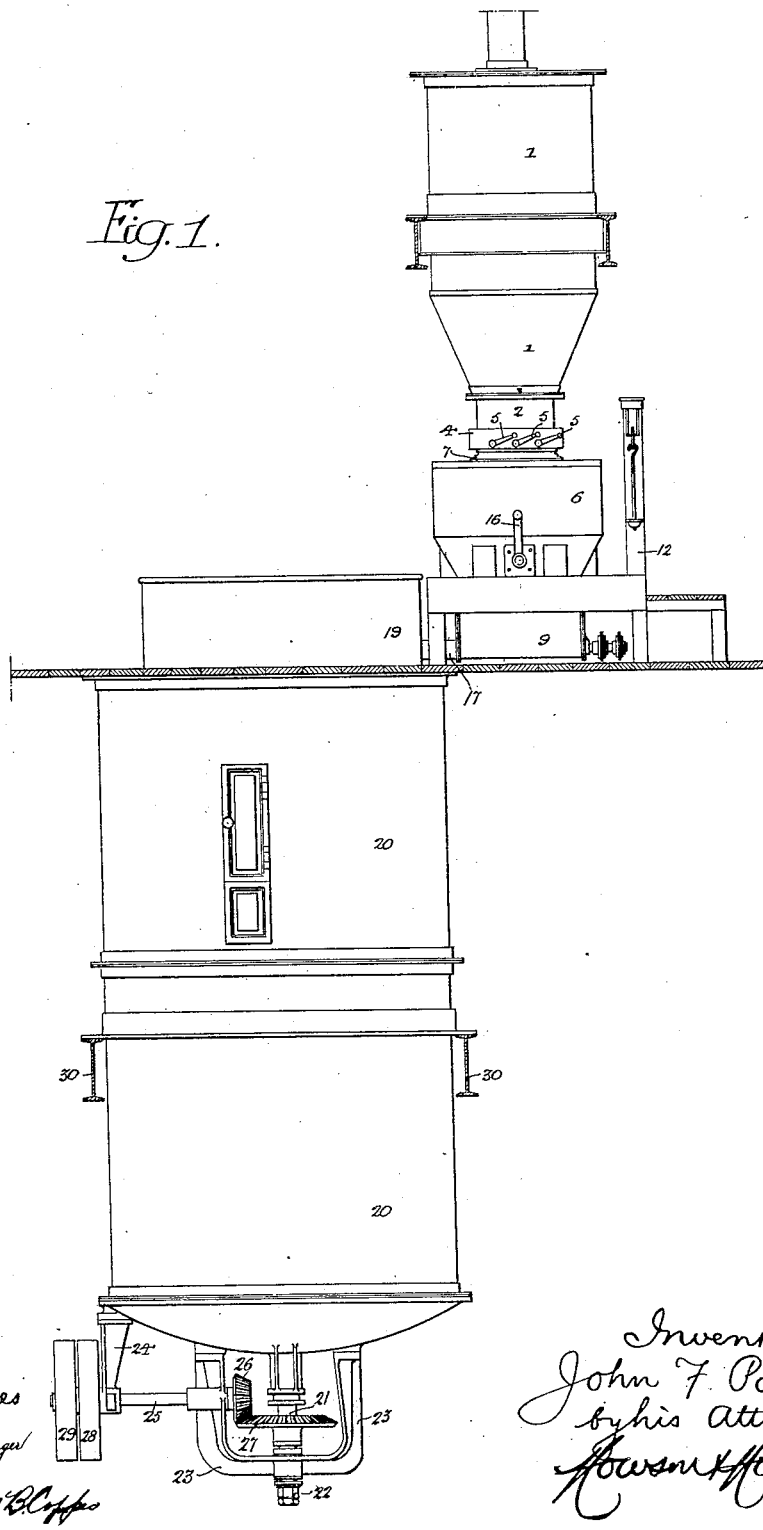
Figure 2:
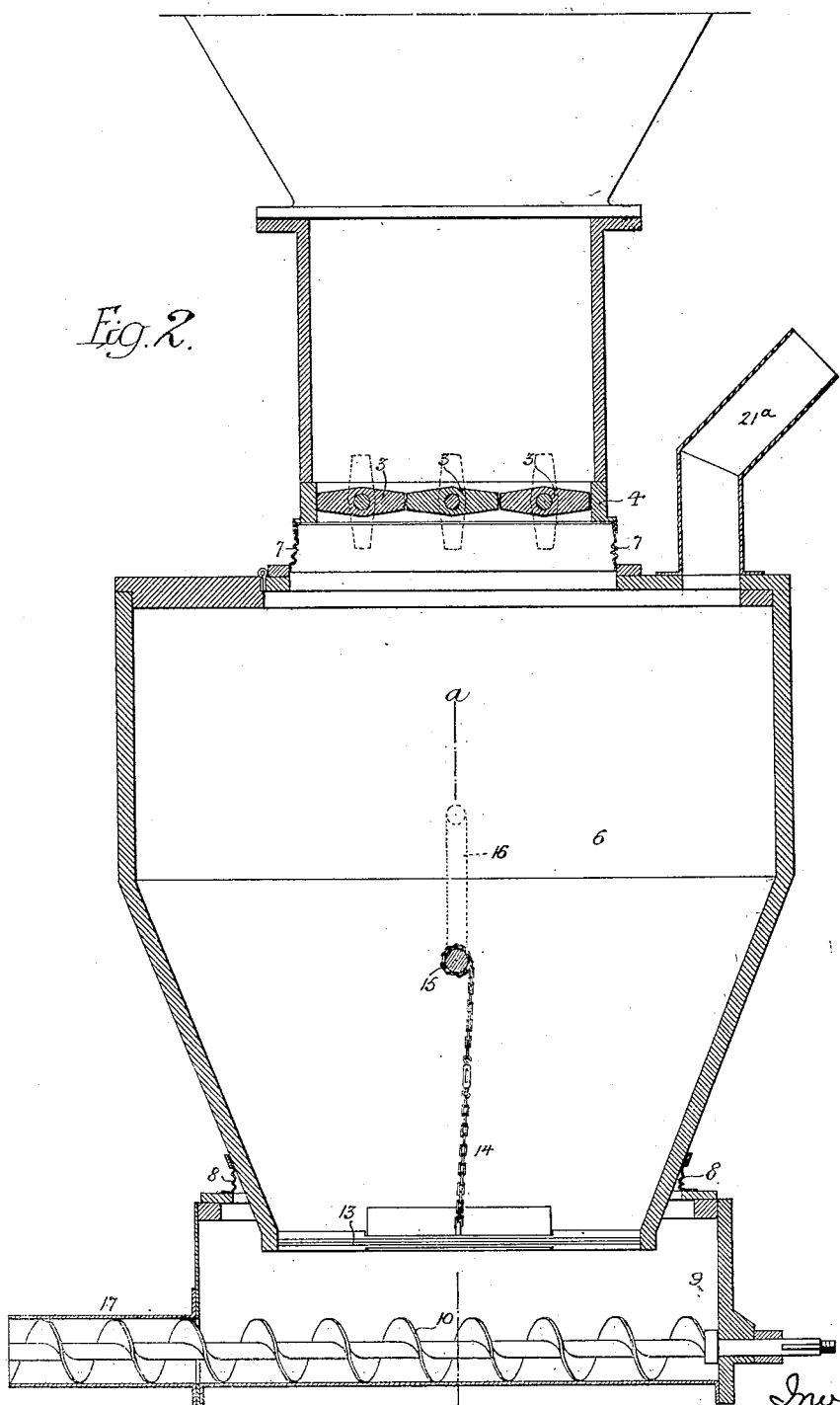
Figure 3:
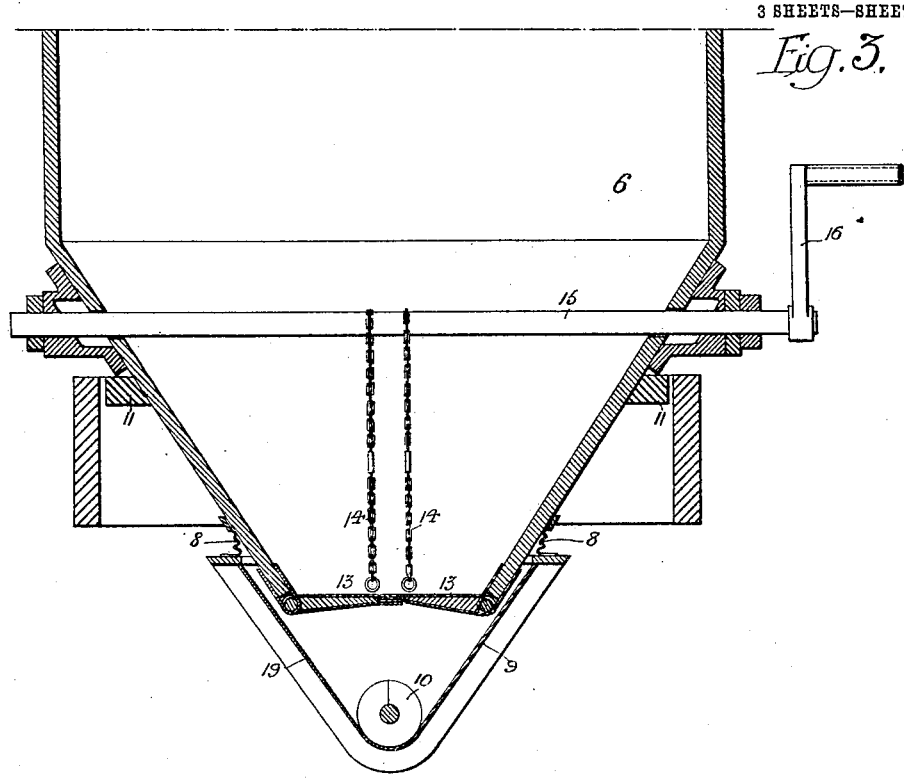

In the accompanying drawings:—Figure 1, is a side elevation of the cooler of a lime sucrate apparatus, constructed and combined with lime weighing, conveying and distributing appliances in accordance with my invention; Fig. 2 is an enlarged sectional view of the weighing hopper, and its appurtenances, and part of the conveyer; and Fig. 3 is a transverse section on the line *a—a*, Fig. 2.

1 represents a hopper in which the powdered lime has been deposited by any suitable form of conveyer, this hopper having, at the bottom, a discharge neck 2, whose outlet is closed by a group of swinging valves 3, the group in the present instance comprising three valves, each of which is centrally pivoted, these valves being disposed edge to edge when closed, but being susceptible of being turned to a vertical position, as shown by dotted lines in Fig. 2, when it is desired to permit escape of powdered lime from the hopper 1, each of the valves having, on the outside of the bottom ring 4 of the neck 2, a handle 5, as shown in Fig. 1. The object of using a plurality of small valves instead of a single large valve as a means of closing the neck 2 is to provide for a slow or gradual flow of the powdered lime into the weighing hopper 6, and a quick checking of such flow as soon as the proper weight of lime has been delivered to said hopper. If one small valve 3 only is used, the powdered lime is liable to arch above the same and thus cut off the flow from the feed hopper to the weighing hopper, but if such an arch is formed when the first of the group of valves 3 is opened it will be broken and the flow will be resumed upon opening one or both of the other valves, and the latter can then be closed in succession, so as to properly restrict the flow before the desired weight of lime has been permitted to enter the weighing hopper, the closing of the final valve quickly cutting off such restricted flow.

Between the bottom ring 4 of the hopper neck 2 and the top of the weighing hopper is an expansible and collapsible tube 7 of closely woven cloth or other material impermeable to the powdered lime, and a similar tube 8 intervenes between the lower portion of the hopper 6 and the casing 9 of the conveyer 10, which is located below said hopper, as shown in Fig. 2.

The hopper 6 is mounted upon the platform 11 of a weighing scale 12, of any appropriate character, and, owing to the flexible tubular connections 7 and 8 at top and bottom of the hopper, the latter is free to fall when the powdered lime contained in it reaches the desired weight, and to rise, as the lime is emptied from it after being properly weighed.

The hopper 6 has a converging bottom closed by a pair of overlapping and swinging valves 13, (Fig. 3) which are connected by chains or other suitable connections 14 to a winding shaft 15 extending transversely across the bottom of the hopper and mounted in suitable bearings thereon, said shaft being rotatable by means of an external crank 16 at one end of the same. The valves 13, when they have been permitted to drop, discharge the contents of the weighing hopper into the conveyer casing 9 from which the lime is carried by the conveyer 10 through a tube 17 and into a dust proof hood 19 at the top of the cooler 20 of the sucrate of lime apparatus, which may be of any desired character, one instance of such apparatus being shown in my Patent No. 861,893, dated July 30, 1907. The tube 17 delivers the finely powdered lime to any suitable distributing device placed in the upper portion of the cooler 20, through which it falls onto the surface of the saccharine liquid contained in the lower portion of said cooler.

If desired, a vent pipe $21^a$ (Fig. 2) may be connected with the upper portion of the weighing hopper 6, this vent pipe being, by preference, in communication with the upper portion of the feed hopper 1, in order that the air and the lime which it carries in suspension, displaced by the lime when the weighing hopper is filled, may be discharged into the feed hopper 1 above.

When a distributing device is used in the upper portion of the cooler 20, it is undesirable or it may even be impracticable to carry upwardly through the cooler the shaft 21 which drives the screw propeller or other device employed for circulating the saccharine liquid in said cooler, hence I mount said shaft upon a suitable step bearing 22, carried by a yoke 23 which is secured to and depends from the lower head of the cooler as shown in Fig. 1, and I also mount in bearings in said yoke and in a depending bracket 24, the shaft 25, which, by means of bevel gears 26 and 27, drives the shaft 21, said shaft 25, being provided with fast and loose pulleys 28 and 29 for receiving the driving belt. By this means all of the driving gearing is carried by the lower portion of the cooler which is suspended from the floor beams 30, hence there can be no derangement of the gearing or interference with the operation of the cooler which might result if the casing of said cooler and the supports for the shafts 21 and 25 were independent of each other or were carried by different floors of the building, susceptible of varying degrees of deflection or subsidence.

I claim:

1. The combination, in sucrate of lime apparatus, of a weighing scale, a hopper therefor, valve mechanism at the bottom of said hopper and wholly within the same, a conveyer casing below said hopper into which the discharge end of the latter projects, and an expansible and contractile section carried by said weighing hopper and secured to the conveyer casing and lying above the discharge mouth of the hopper for sealing the space between said structures.

2. The combination, in sucrate of lime apparatus, of a weighing scale, a hopper therefor, valve mechanism at the bottom of said hopper and wholly within the same, means for operating said valve mechanism a feed hopper above said weighing hopper, a series of independently operated valves carried by said feed hopper, and an expansible and contractile section connected to both of said hoppers and sealing the space between the same.

3. The combination, in sucrate of lime apparatus, of a weighing scale having a hopper, a feed hopper above said weighing hopper having a contracted outlet communicating with said weighing hopper at a central point, the top of said latter hopper being apertured for the passage of material discharged through said contracted outlet, an expansible and contractile section connected to said neck and the walls of the inlet opening in the weighing hopper, a conveyer casing below the weighing hopper into which the discharge end of the latter projects, an expansible and contractile section closing the space between said parts and lying above the discharge mouth of the hopper, and conveying means within said latter casing for discharging the material therefrom.

4. The combination, in sucrate of lime apparatus, of a weighing scale having a hopper, a feed hopper above said weighing hopper having a neck through which it communicates with the latter, and a plurality of solid co-acting valves disposed in said neck and operating in a single horizontal plane for governing the flow of powdered material through the same.

5. The combination, in sucrate of lime apparatus, of a weighing scale, a hopper therefor, a feed hopper above said weighing scale having a neck through which it communicates with the same, and a plurality of independent co-acting valves disposed in said neck and operable in a single horizontal plane for governing the flow of powdered material through said neck.

6. The combination, with sucrate of lime apparatus comprising a cooler having a dustproof hood, of a weighing scale having a hopper in communication with said hood, a feed hopper above said weighing hopper having a contracted neck communicating with said weighing hopper within the marginal walls of the same, an expansible and contractile section connected to said neck and the wall of the opening in the weighing hopper and sealing the space between the same, a closed connection between the weighing hopper and said hood, and a conveyer within said closed connection for delivering the weighed material to the sucrate of lime apparatus.

7. The combination, with sucrate of lime apparatus comprising a cooler having a dustproof hood, of a weighing scale having a hopper in communication with said hood, a feed hopper above said weighing hopper having a contracted neck communicating with said weighing hopper within the marginal walls of the same, an expansible and contractile section connected to said neck and the wall of the opening in the weighing hopper and sealing the space between the same, an expansible and contractile section between the weighing hopper and said hood lying above the discharge opening of the latter, and a conveyer within said hood for delivering the weighed material to the sucrate of lime apparatus.

In testimony whereof, I have signed my name to this specification, in the presence of two subscribing witnesses.

JOHN F. POOL.

Witnesses:
 WM. E. SHULSE,
 JOS. H. KLEIN.